July 31, 1951   F. F. FISHER ET AL   2,562,661
LATHE ACCESSORY

Filed May 9, 1947   3 Sheets-Sheet 1

Ferdinand F. Fisher
Arnold J. Fisher
INVENTORS

BY

ATTORNEY

July 31, 1951   F. F. FISHER ET AL   2,562,661
LATHE ACCESSORY
Filed May 9, 1947   3 Sheets-Sheet 2
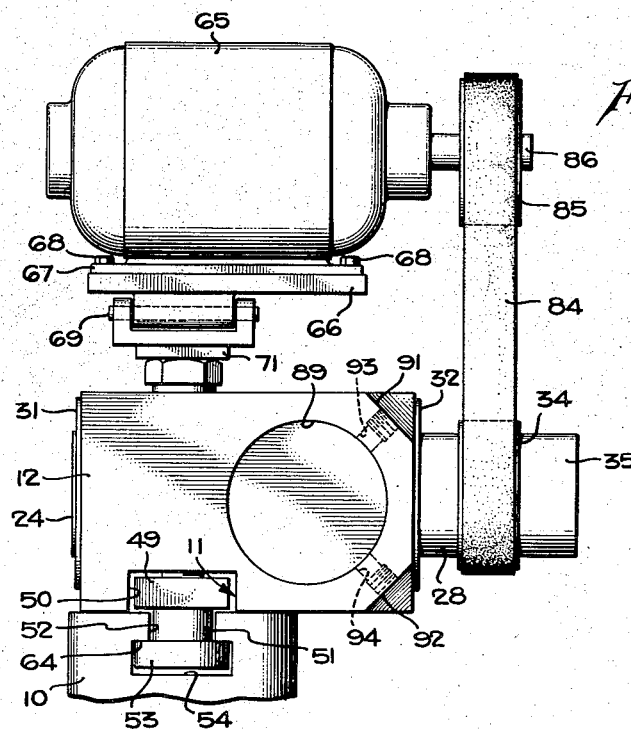
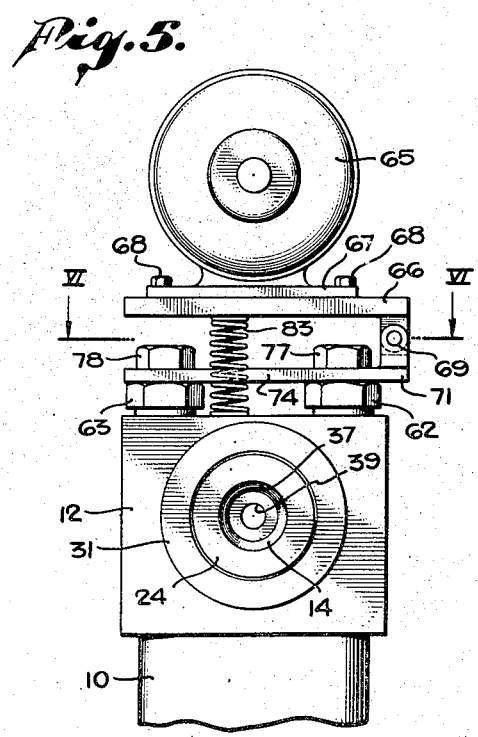
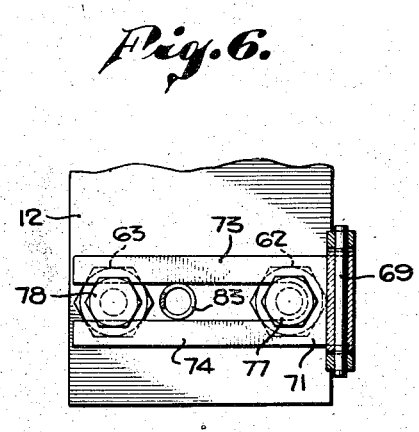
Ferdinand F. Fisher
Arnold J. Fisher
INVENTORS
BY
ATTORNEY July 31, 1951  F. F. FISHER ET AL  2,562,661
LATHE ACCESSORY
Filed May 9, 1947  3 Sheets-Sheet 3

Ferdinand F. Fisher
Arnold J. Fisher
INVENTORS

BY
ATTORNEY

Patented July 31, 1951

2,562,661

UNITED STATES PATENT OFFICE 2,562,661

LATHE ACCESSORY

Ferdinand F. Fisher and Arnold J. Fisher,
Van Nuys, Calif.

Application May 9, 1947, Serial No. 747,088

3 Claims. (Cl. 90—11)

This invention relates to an accessory for use with machine tools and, more particularly but not necessarily, to an attachment for lathes.

The attachments for lathes known to me are bulky, expensive and inflexible and have limitations for many operations, and consequently much additional equipment is required to perform certain operations. It is, therefore, a primary object of this invention to provide and produce an attachment for lathes, which may be mounted on either the compound rest or milling attachment of the lathe, that shall accomplish operations which heretofore have required additional equipment.

Another object is to provide a lathe attachment which will be compact in structure, accessible for operation through an arc of 360° and which may be readily adjusted for operations heretofore requiring additional equipment.

A further object is to provide an attachment for a lathe which may be operated from any suitable source of power, such as a flexible shaft connected to a motor or a belt drive.

A still further object is to provide an accessory that may be readily attached or detached to a compound rest or a milling attachment of a lathe that shall be rigid when attached and positioned, that shall be efficient in operation, effective for a wide range of operations, durable and comparatively cheap to manufacture.

The above and other objects will be made apparent throughout the further description of the invention when taken in connection with the accompanying drawings wherein like reference characters refer to like parts. It is to be distinctly understood that the drawings are not a definition of the invention but merely illustrate certain exemplary forms by means of which the invention may be effectuated.

In the drawings:

Fig. 4 is a side elevational view of a device illustrating one manner in which the device may be belt driven.

Fig. 5 is an elevational view taken from the left end of Fig. 4.

Fig. 6 is a sectional view taken along the line VI—VI of Fig. 5.

Figure 1:
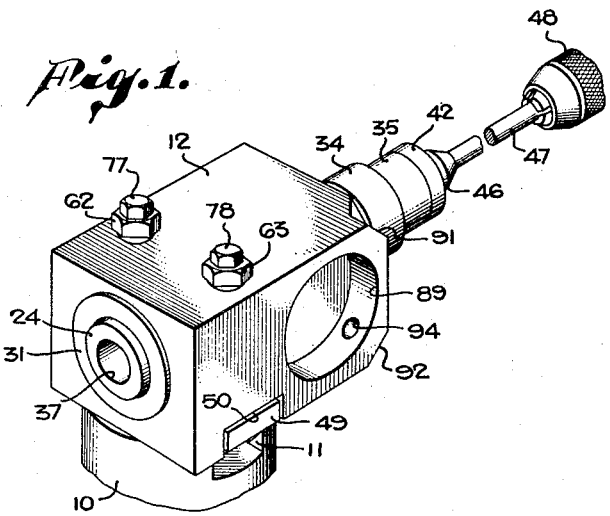
Fig. 1 is a perspective view of an attachment embodying the invention shown mounted in the inverted T slot of a compound rest.

The present attachment is particularly adapted for use with conventional lathes equipped with head stock, tail stock and a bed over which a conventional carriage is longitudinally slidable, the latter supporting the usual compound rest 10 provided with the conventional inverted T-shaped slot 11. The present attachment consists of a block 12 having a longitudinal bore 13 extending therethrough. Within the longitudinal bore is mounted a shaft 14, rotatably supported in forward bearing 15 and rear bearing 16. The block is recessed at the front and back thereof as shown at 17 and 18, respectively. The forward end of the shaft 14 terminates in a radial extended projection 24, the latter providing a shoulder 25 adapted to rest against the opposing surface of the flange 19 of bearing 15. The shaft 14 has a reduced portion 26 which extends rearwardly of the block 12, the reduced portion 26 having a threaded end portion 27. An annular or tubular bearing retaining member 28 is mounted on the threaded portion 27, the forward end of which terminates in a radially extending flange 29, the latter being adapted to engage the opposing face of the flange 19 of the bearing 16 and hold the same in place within the bore 13. Suitable dust caps 31 and 32 may be provided at the forward and rear ends of the recesses 17 and 18, respectively, for the conventional purpose.

The rear end of the bearing-retaining member 28 terminates in a conical portion 33 adapted to engage a like conical recess in the forward end of a pulley 34. The pulley 34 is reduced at 35 to provide a step pulley. A longitudinally threaded opening is provided through the step pulleys as shown at 36 for the purpose of threading the step pulleys onto the rear end of the threaded portion 27 of the shaft 14.

The forward conical recessed end of the pulley 34 rests against the conical portion 33 of the bearing-retaining member 28 and holds the latter in proper position on the shaft.

The shaft 14 is provided with a tapered axial opening or tool socket 37 for the reception of the usual tools used in connection with lathes. The opening or socket 37 extends a sufficient distance from the forward end of the shaft 14 to accommodate conventional tools.

The swing of lathes varies according to size, and it is to be understood that the present attachment is to be designed for the size of the lathe on which it is to be used. In the designing of the present attachment for use on the compound rest of a lathe, it is important that the axial center line of the socket be in the same horizontal plane as the center line between the head stock and tail stock of the lathe.

For the purpose of knocking out tools, the shaft 14 is provided with a smaller axial opening 39 which continues from socket 37 through the remainder of the shaft 14. In addition to the opening or bore 39 serving as a knock-out hole for tools, it is here employed to receive a projection 41 carried axially of a coupling 42. The coupling is further provided with a dowel pin 43 parallel to and spaced from the central member 41, the pin 43 being adapted to engage longitudinal openings 44 or 45 provided in the inner end of the pulley 35.

The coupling 42 is provided with an integral, rearwardly extending portion 46, the latter being connected by any suitable means 47 to a chuck or other driving member 48. The member 47 may be a flexible shaft, a rigid shaft or otherwise, connected to the chuck of a drill or to an electric motor or any other source of power.

In one application of the device, means is provided for connecting the block 12 to the compound rest 10 of a lathe. The means consists of a rectangular block 49 disposed in a rectangular transverse recess 50, provided in the bottom of the block 12 and adjacent the forward end thereof. The depth of the recess 50 is greater than the thickness of the rectangular block 49, the purpose of which will be later understood.

Figure 3:
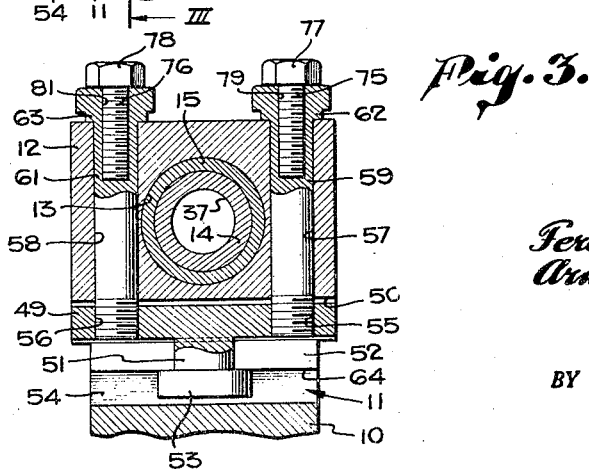
Fig. 3 is a sectional view taken along the line III—III of Fig. 2.

The rectangular block 49 is provided with a boss 51 integral therewith and projecting downwardly from the center thereof. The boss 51 is circular and adapted to turn within the smaller recess 52 of the inverted T-shaped slot 11. The lower end of the boss 51 terminates in an annular, radially extending flange 53, the latter adapted to slidably engage the lower or larger recess 54 of the T-shaped slot 11. The rectangular block 49 is provided with vertical internally threaded openings 55 and 56 (see Fig. 3). The openings 55 and 56 are spaced apart and in transverse axial alignment with the boss 51 and rectangular block 49. The openings 55 and 56 are disposed equidistant on opposite sides of the vertical center of the boss 51. The block 12 is provided with complementary openings or bores 57 and 58, respectively, through which bolts 59 and 61, respectively, extend. The bolts have head portions 62 and 63 for engaging the surfaces of the block adjacent to the openings 57 and 58. The lower ends of the bolts 59 and 61 are threaded into the threaded openings 55 and 56 provided in the rectangular block 49. It can now be understood that upon threading and tightening the bolts into the openings 55 and 56, the upper surfaces of flange 53 will be drawn into contact with the lower or adjacent surfaces of shoulder 64 provided at the intersection of the slots 54 and 52 of the inverted T-shaped slot 11, and since the rectangular block 49 is of less thickness than the depth of the recess 50, the rectangular block 49 will be drawn upwardly and the block 12 clamped rigidly against the upper surface of the compound rest 10.

Since boss 51 is cylindrical, the axis or bore of rotatable shaft 1 may be turned and pointed in any desired direction and any desired angle with respect to the line between head and tail stocks of the lathe, before the body of the attachment is clamped into position.

Figure 2:
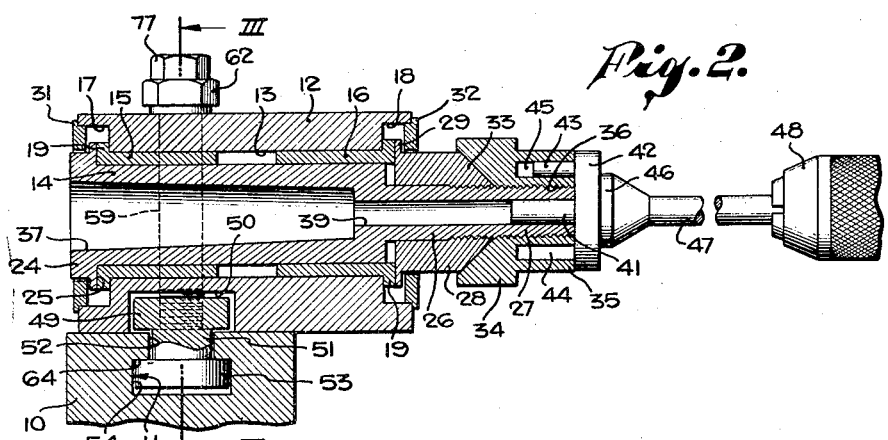
Fig. 2 is a vertical, sectional view taken through the longitudinal center of Fig. 1.

Figs. 4 to 6, inclusive, illustrate one manner in which the present device may be belt driven by an electric motor 65. A novel motor mount is provided which consists of a supporting plate 66 on which rests the base 67 of the motor 65. Any suitable means, such as bolts 68 may be provided for fixing the motor base to the mounting plate 66. The mounting plate 66 is supported at one of its ends by a pivotal connection 69, the latter adapted to space the mounting plate 66 above a horizontally disposed U-shaped member 71, the right end of the latter carrying the lower portion of the pivotal means 69. The member 71 has two legs 73 and 74 spaced apart sufficient to receive the threaded portions of bolts 75 and 76, the bolts 75 and 76 being provided with heads 77 and 78. The bolts 75 and 76 are threaded into openings 79 and 81, provided in the bolts 59 and 61, respectively. The bolts 75 and 76 are of sufficient diameter to receive the legs 73 and 74 of member 71, while the bolt heads 77 and 78 will engage the upper surfaces of legs 73 and 74. Therefore, upon threading the bolts 75 and 76 into openings 79 and 81, the member 71 will be locked to and rigidly supported by bolt heads 62 and 63. A spring member 83 is vertically disposed between the legs 73 and 74 of member 71, the lower end of the spring resting on the block 12 and the upper end supporting the mounting plate 66. The purpose of the pivotal connection 69 and the spring 83 is to provide proper friction of the belt 84 with the pulley 85, the latter being mounted on a motor shaft 86, the belt 84 extending around the pulley 35, previously described in connection with Figs. 1 and 2, inclusive.

Figure 7:
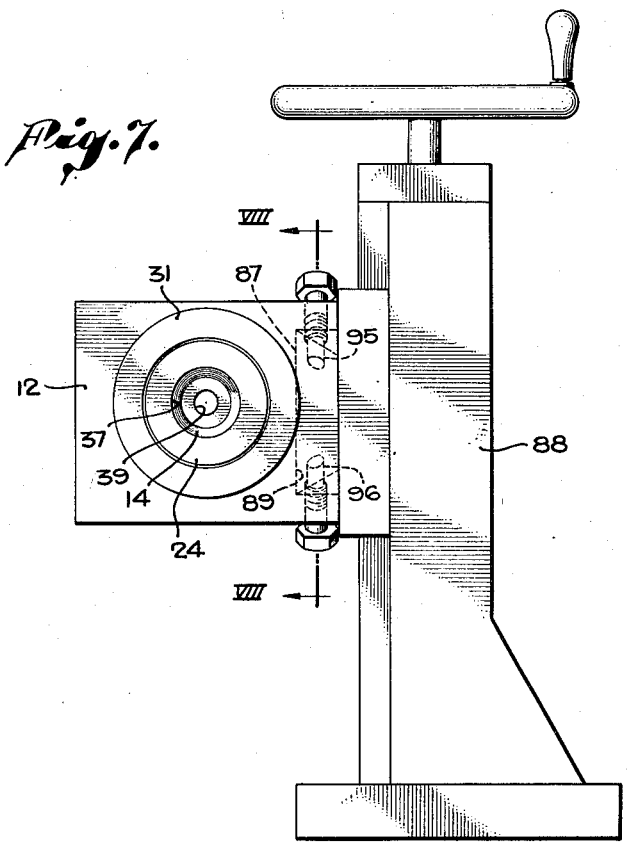
Fig. 7 is an elevational view showing the present device mounted on a lathe milling attachment.
Figure 8:
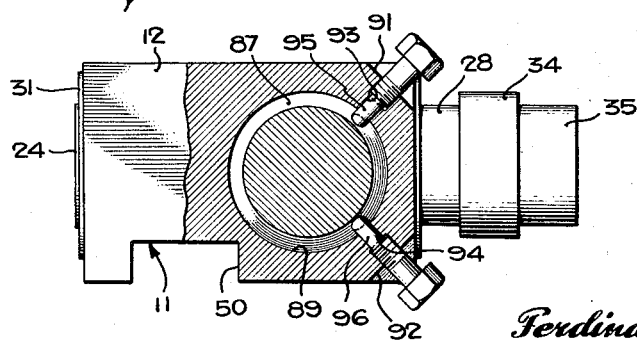
Fig. 8 is a sectional view taken along the line VIII—VIII of Fig. 7.

Figs. 7 and 8 illustrate a different application of the present device wherein the attachment is mounted on a conical projection 87, the latter usually being provided on conventional milling attachments 88. For the purpose of mounting the present attachment onto the conical projection 87, a cylindrical recess 89 is provided in the block 12 on the side thereof and adjacent the rear end of the block 12. The upper and lower rear corners of the block 12 adjacent to the recess 89 are cut away as shown at 91 and 92, through which are provided openings 93 and 94, respectively. The opening 89 in the block 12 is inserted over the conical portion 87, carried by the milling attachment 88, and conical portion 87 is fixed within the opening 89 by means of dowel pins 95 and 96 disposed in the openings 93 and 94, respectively.

It can now be understood that the device when fastened to the milling attachment as just described may be rotated in a vertical plane through 360° and that the device may be raised and lowered in accordance with the height of which the milling attachment 88 is designed.

The present attachment may be used to perform almost all kinds of milling operations, boring and drilling holes, tapping, gear cutting, surface grinding and external grinding. Also, the present device may be mounted as an accessory on drill press tables or in a drill press vise or on any other machine tool having an inverted, T-shaped slot or any other suitable means for connecting said device.

Further, the device is flexible and compact and adapted for use with a wide choice of tools. The device may be driven by any source of power and positioned as required in order to obtain access for operations which would ordinarily be inaccessible with other attachments and which obviates the necessity of much additional equipment to accomplish required operations.

While we have illustrated and described a preferred form of the present attachment and certain forms by means of which the same may be driven and mounted, it will now be apparent to those skilled in the art that certain modifications, changes, additions, substitutions and omissions may be made in the present device and the manner in which the same is driven and mounted without departing from the spirit and scope of the appended claims.

We claim:

1. An attachment for a lathe including: a block with a bore therethrough; a shaft mounted for rotation in said bore, said shaft having an axial tool-holding socket in one end thereof and a driving connection on its other end; mounting means carried by said block, said mounting means including a longitudinally extending member rigidly fixed to the block, a second longitudinally extending member spaced from the first and substantially parallel thereto, a lug on each of said members projecting perpendicularly to the planes thereof, a pivotal connection joining said lugs, and a spring spaced from said pivotal connection and extending perpendicularly to said members from the block to said second member; a motor secured to said second longitudinally extending member provided with an output shaft and a pulley mounted thereon; and means connecting said pulley with said driving connection for driving the shaft in said bore.

2. An attachment for a lathe including: a block with a bore therethrough; a shaft mounted for rotation in said bore, said shaft having an axial tool-holding socket in one end thereof and a driving connection on its other end; mounting means carried by said block, said mounting means including a longitudinally extending member rigidly fixed to the block, a second longitudinally extending member spaced from the first and substantially parallel thereto, a lug on each of said members projecting perpendicularly to the planes thereof, a pivotal connection joining said lugs, and a spring spaced from said pivotal connection and extending perpendicularly to said members from the block to said second member; a motor secured to said second longitudinally extending member provided with an output shaft and a pulley mounted thereon; means connecting said pulley with said driving connection for driving the shaft in said bore; and releasable means carried by the block for positioning said block and motor upon a support.

3. An attachment for a lathe including: a block with a bore therethrough; a shaft mounted for rotation in said bore, said shaft having an axial tool-holding socket in one end thereof and a driving connection on its other end; mounting means carried by said block, said mounting means including a longitudinally extending member rigidly fixed to the block, a second longitudinally extending member spaced from the first and substantially parallel thereto, a lug on each of said members projecting perpendicularly to the planes thereof, a pivotal connection joining said lugs, and a spring spaced from said pivotal connection and extending perpendicularly to said members from the block to said second member; a motor secured to said second longitudinally extending member provided with an output shaft and a pulley mounted thereon; means connecting said pulley with said driving connection for driving the shaft in said bore; and releasable means carried by the block for adjustably positioning said block and motor upon a support.

FERDINAND F. FISHER.
ARNOLD J. FISHER.

REFERENCES CITED

The following references are of record in the file of this patent:

UNITED STATES PATENTS

| Number | Name | Date |
|---|---|---|
| 842,972 | Power | Feb. 5, 1907 |
| 1,057,005 | Miles | Mar. 25, 1913 |
| 1,488,806 | Church | Apr. 1, 1924 |
| 1,617,807 | Helfgott | Feb. 15, 1927 |
| 1,945,292 | Palmer | Jan. 30, 1934 |
| 2,375,789 | Hungerford | May 15, 1945 |
| 2,386,461 | Hellman | Oct. 9, 1945 |

FOREIGN PATENTS

| Number | Country | Date |
|---|---|---|
| 360,547 | France | Apr. 25, 1906 |